(12) United States Patent
Learakos

(10) Patent No.: US 8,651,063 B1
(45) Date of Patent: Feb. 18, 2014

(54) WHEELED DOG COVER

(76) Inventor: Dorothy L. Learakos, Naples, FL (US)

( * ) Notice: Subject to any disclaimer, the term of this patent is extended or adjusted under 35 U.S.C. 154(b) by 0 days.

(21) Appl. No.: 13/603,493

(22) Filed: Sep. 5, 2012

(51) Int. Cl.
*A01K 29/00* (2006.01)

(52) U.S. Cl.
USPC .......................................... 119/843; 119/751

(58) Field of Classification Search
USPC ......... 119/453, 452, 472, 474, 482, 470, 489, 119/491, 492, 496, 497, 498, 499, 512, 513, 119/514, 519, 843, 848, 849, 847, 751, 752, 119/727; D30/109; 280/47.17, 651, 47.33, 280/652, 47.26
See application file for complete search history.

(56) References Cited

U.S. PATENT DOCUMENTS

| | | | |
|---|---|---|---|
| 2,976,840 A * | 3/1961 | Hugus | 119/727 |
| 3,621,819 A | 11/1971 | Hooper | |
| 4,349,210 A | 9/1982 | Rutt | |
| 4,796,565 A | 1/1989 | Charbeneau | |
| 5,113,793 A | 5/1992 | Leader et al. | |
| 5,918,611 A | 7/1999 | Amato | |
| 6,209,491 B1 * | 4/2001 | Olson | 119/706 |
| 6,374,775 B1 | 4/2002 | Baumsteiger | |
| 6,786,181 B1 | 9/2004 | Leanheart | |
| 6,913,271 B2 | 7/2005 | Gordon | |
| 7,021,246 B2 | 4/2006 | Seymour | |
| 7,261,060 B1 | 8/2007 | Garofola et al. | |
| D566,907 S | 4/2008 | Barca | |
| 2004/0065270 A1 | 4/2004 | King | |
| 2006/0048716 A1 | 3/2006 | Garofola | |
| 2006/0169218 A1 | 8/2006 | Chang | |
| 2007/0056524 A1 * | 3/2007 | Barca | 119/496 |
| 2008/0289586 A1 | 11/2008 | O'Connor | |

FOREIGN PATENT DOCUMENTS

WO    WO2008/139486    11/2008

* cited by examiner

*Primary Examiner* — T. Nguyen

(74) *Attorney, Agent, or Firm* — The Livingston Firm; Edward M. Livingston, Esq.; Bryan L. Loefler, Esq.

(57) ABSTRACT

A wheeled dog cover (1) having a frame (3) wheels (24) located thereon. Said frame having a top panel (7) and side panels (6, 8) that cover side portions (9a, 9b) and a top portion (10) of the frame to protect a dog from rain and other elements. Panels may also be located on the front and back of the frame to fully enclose the frame. A push handle (22) is provided for controlling movement of the wheeled dog cover. In addition a leash attachment bar (23) is located on the wheeled dog cover for attaching a dog's leash to so as a dog walks the wheeled dog cover moves with the dog. The front wheels of the walker are preferably swivel wheels to allow the wheeled dog cover to be steered right or left.

20 Claims, 2 Drawing Sheets

WHEELED DOG COVER

FIELD OF THE INVENTION

This invention relates to devices used for walking dogs and more particularly a covered frame having wheels that protects one or more dogs from the rain and other elements while being walked outdoors.

BACKGROUND OF THE INVENTION

Many individuals go to great lengths to offer care and protection for their dogs. For example, when taking a dog outside for a walk protection is needed from rain, snow, and/or sun exposure. Often, an individual is required to share his or her umbrella with the dog. This can be impractical for the dog walker and inefficient for providing adequate protection to both the dog walker and the dog.

Therefore, a need exists for a wheeled dog cover that protects a dog from the elements while being walked outdoors.

The relevant prior art includes the following references:

| Pat. No. | Inventor | Issue/Publication Date |
| --- | --- | --- |
| (U.S. Pat. References) | | |
| 3,621,819 | Hooper | Nov. 23, 1971 |
| 4,349,210 | Rutt | Sep. 14, 1982 |
| 4,796,565 | Charbeneau | Jan. 10, 1989 |
| 5,113,793 | Leader et al. | May 19, 1992 |
| 5,918,611 | Amato | Jul. 06, 1999 |
| 6,374,775 | Baumsteiger | Apr. 23, 2002 |
| 2004/0065270 | King | Apr. 08, 2004 |
| 6,786,181 | Leanheart | Sep. 07, 2004 |
| 6,913,271 | Gordon | Jul. 05, 2005 |
| 2006/0048716 | Garofola | Mar. 09, 2006 |
| 7,021,246 | Seymour | Apr. 04, 2006 |
| 2006/0169218 | Chang | Aug. 03, 2006 |
| 7,261,060 | Garofola et al. | Aug. 28, 2007 |
| D566,907 | Barca | Apr. 15, 2008 |
| 2008/0289586 | O'Connor | Nov. 27, 2008 |
| (Foreign Patent References) | | |
| WO2008/139486 | Soni | Nov. 20, 2008 |

SUMMARY OF THE INVENTION

The primary object of the present invention is to provide a wheeled dog cover that protects a dog from rain, snow, and/or sun exposure while being walked outdoors.

A further object of the present invention is to provide a wheeled dog cover that protects a dog from the elements while leaving the dog walkers hands free to carry an umbrella.

An additional object of the present invention is to provide a wheeled dog cover that may provide protection to more then one dog while being walked at the same time.

The present invention fulfills the above and other objects by providing a wheeled dog cover having a wheeled frame, which may be collapsible, having a cover that extends over the sides and top of the frame to protect a dog from rain and other elements. Panels may also be located on the front and back of the frame to fully enclose the frame. The panels may be removable or may be rolled upward so the front, back and/or sides of the frame are open to provide ventilation. A push handle is provided for controlling the movement of the wheeled dog cover. In addition a leash attachment bar or other attachment point for attaching a leash to the wheeled dog cover is located thereon for attaching a dog's leash so as a dog walks the wheeled dog cover moves with the dog. The front wheels of the walker are preferably swivel wheels to allow the wheeled dog cover to be steered right or left. A pocket or other storage area may also be located on the cart to carry various objects, such as rain coats, plastic bags, personal items and so forth.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
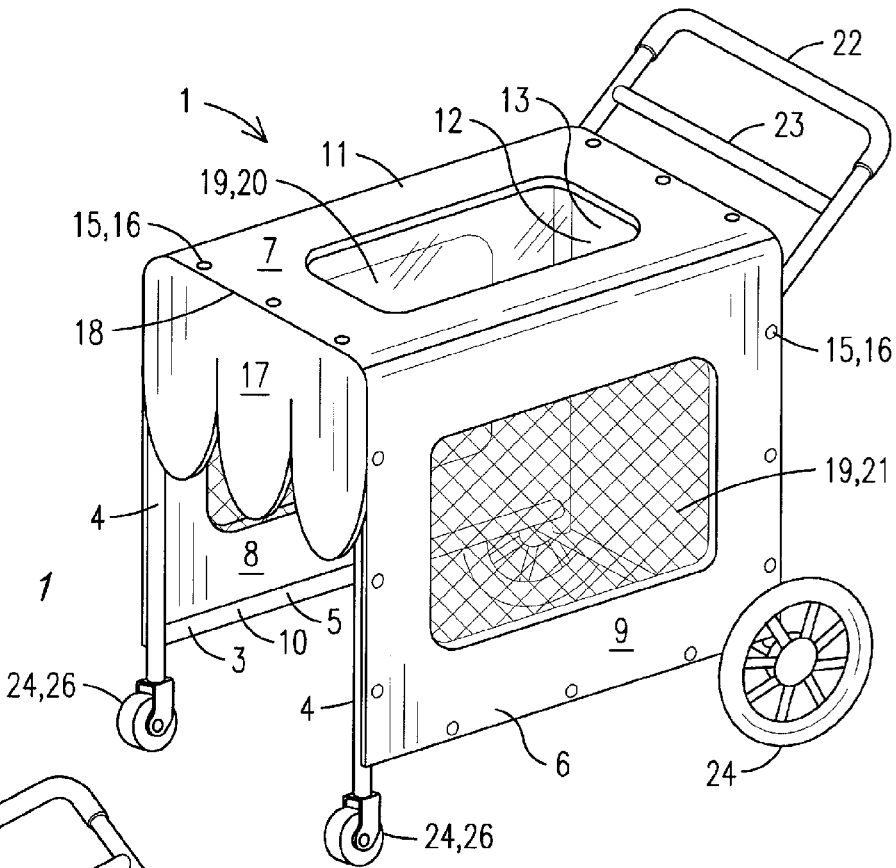
FIG. 1 is a perspective side view of dog walking cart of the present invention having side and top panels installed thereon with a front panel in an open position.
Figure 3:
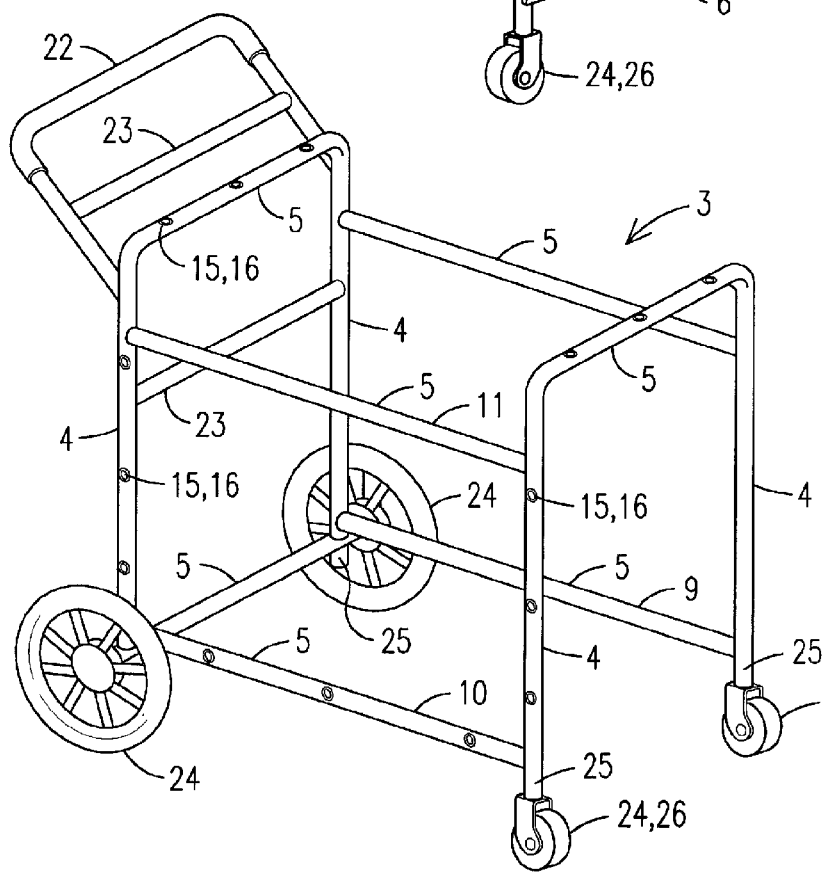
FIG. 3 is a perspective side view of a frame of a dog walking cart of the present invention.
Figure 2:
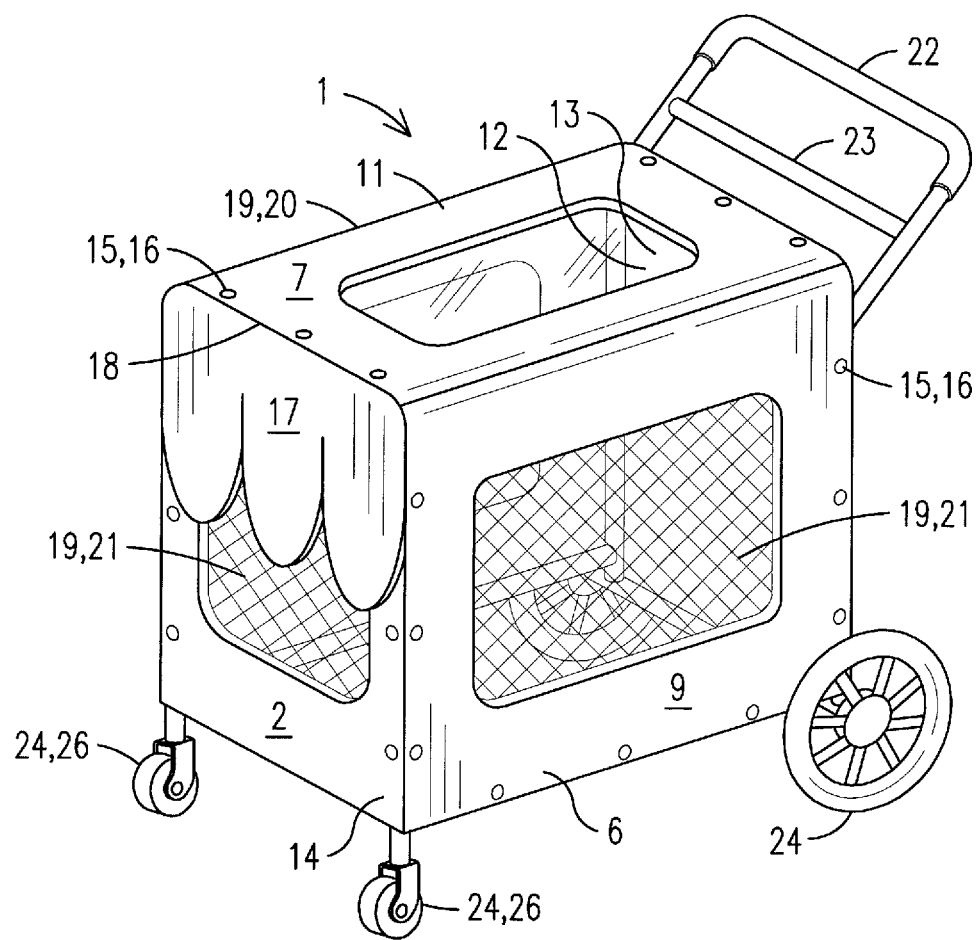
FIG. 2 is a perspective side view of dog walking cart of the present invention having side and top panels installed thereon with a front panel in an closed position.

For purposes of describing the preferred embodiment, the terminology used in reference to the numbered components in the drawings is as follows:

1. wheeled dog cover, generally
2. front panel
3. frame
4. vertical support
5. horizontal support
6. first side panel
7. top panel
8. second side panel
9. first side portion of frame
10. second side portion of frame
11. top portion of frame
12. rear panel
13. rear portion of frame
14. front portion of the frame
15. attachment means
16. snap
17. valance
18. edge of top panel
19. window
20. clear plastic
21. screen
22. push handle
23. leash attachment bar
24. wheel
25. lower end of vertical support
26. swivel wheel With reference to FIGS. 1, 2 and 3, perspective side views of a wheeled dog cover 1 of the present invention having a front panel 2 in an open position, a front panel 2 in a closed position and a frame 3 of the present invention, respectively, are illustrated. The wheeled dog cover 1 comprises a frame 3, as illustrated in FIG. 3, having vertical supports 4 and horizontal supports 5 that provide a support structure and attachment points for attaching a first side panel 6, a top panel 7 and a second side panel 8 to enclose a first side portion 9, a second side portion 10 and a top portion 11 of the frame 3. The top portion 11 may be flat or curved. A rear panel 12 encloses a rear portion 13 of the frame 3 and a front panel 2 enclosed a front portion 14 of the frame 3. The first side panel 6, second side panel 8, front panel 2 and rear panel 12 are preferably removeably attachable to the frame 3 via attachment means 15, such as snaps 16, buttons, hook and loop fastener, zippers and so forth. The first side panel 6, second side panel 8, front panel 2 and rear panel 12 may also be rolled upward into a stored position to provide ventilation to the interior of the wheeled dog cover 1. One or more valances 17 may be located proximate to the edges 18 of the top panel 7 to conceal the first side panel 6, second side panel 8, front panel 2 and rear panel 12 when in a rolled and stored position. Windows 19 may also be located on the first side panel 6, second side panel 8, front panel 2, rear panel 12 and top panel 7. The windows 19 may be constructed out of a clear plastic 20, screen 21, mesh and so forth. A push handle 22 is located on the rear portion 13 of the frame 3 to allow a means for controlling the movement of the wheeled dog cover 1. One or more leash attachment bars 23 are preferably located on the rear portion 13 of the frame 3 or proximate to the push handle 22 to provide an attachment point for attaching a dog's leash to the wheeled dog cover 1. Wheels 24 are located at lower ends 25 of the vertical supports 4 of the frame 3. Two or more of the wheels 24 are preferably swivel wheels 26 to allow the wheeled dog cover 1 to be steered right or left.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A wheeled dog cover comprising:
   four upper horizontal supports forming a substantially rectangular shape having corners from which four vertical supports extend downward to connect to two lower side horizontal supports and a rear horizontal support all forming a forming a substantially cuboid-shaped frame that will surround a dog and allow the dog to walk freely within the substantially cuboid-shaped frame having a front portion, a first side portion, a second side portion, a top portion and a rear portion;
   wheels located at lower ends of the four vertical supports;
   a top panel attached to the upper portion of the frame in a manner so the top panel is pulled taut on the frame, thereby covering the upper portion and being capable of deflecting rain;
   a push handle located on the rear portion of the frame;
   a first side panel removeably attachable to the frame via a plurality of attachment means located proximal to corners of the first side panel;
   said first side panel covering the first side portion of the frame;
   a second side panel removeably attachable to the frame via a plurality of attachment means located proximal to corners of the first side panel; and
   said second side panel covering the second side portion of the frame.

2. The wheeled dog cover of claim 1 further comprising:
   a rear panel attached to the frame that covers the rear portion of the frame.

3. The wheeled dog cover of claim 1 further comprising:
   at least one valance located on an edge of the top panel.

4. The wheeled dog cover of claim 1 further comprising:
   a leash attachment bar located on the wheeled dog cover for attaching a leash to the wheeled dog cover.

5. The wheeled dog cover of claim 1 wherein:
   at least two of the wheels located at lower ends of the four vertical supports are swivel wheels.

6. The wheeled dog cover of claim 1 wherein:
   the plurality of attachment means attaching the first side panel to the frame is a plurality of snaps located on the frame and on the first side panel;
   the plurality of attachment means attaching the second side panel to the frame is a plurality of snaps located on the frame and on the second side panel.

7. The wheeled dog cover of claim 1 wherein:
   a window is located on the top panel to allow an individual to view a dog being walked using the wheeled dog cover.

8. The wheeled dog cover of claim 1 wherein:
   said first side panel and second side panel are both rollable so that the first side panel and the second side panel may be rolled upward into a stored position.

9. A wheeled dog cover comprising:
   four upper horizontal supports forming a substantially rectangular shape having corners from which four vertical supports extend downward to connect to two lower side horizontal supports and a rear horizontal support all forming a forming a substantially cuboid-shaped frame that will surround a dog and allow the dog to walk freely within the substantially cuboid-shaped frame having a front portion, a first side portion, a second side portion, a top portion and a rear portion;
   wheels located at lower ends of the four vertical supports;
   a top panel attached to the upper portion of the frame in a manner so the top panel is pulled taut on the frame, thereby covering the upper portion and being capable of deflecting rain;
   a push handle located on the rear portion of the frame;
   a first side panel removeably attachable to the frame via a plurality of attachment means located proximal to corners of the first side panel;
   said first side panel covering the first side portion of the frame;
   a second side panel removeably attachable to the frame via a plurality of attachment means located proximal to corners of the first side panel;
   said second side panel covering the second side portion of the frame; and
   said first side panel and second side panel are both rollable so that the first side panel and the second side panel may be rolled upward into a stored position.

10. The wheeled dog cover of claim 9 further comprising:
    a rear panel attached to the frame that covers the rear portion of the frame.

11. The wheeled dog cover of claim 9 further comprising:
    at least one valance located on an edge of the top panel.

12. The wheeled dog cover of claim 9 further comprising:
    a leash attachment bar located on the wheeled dog cover for attaching a leash to the wheeled dog cover.

13. The wheeled dog cover of claim 9 wherein:
    at least two of the wheels located at lower ends of the four vertical supports are swivel wheels.

14. The wheeled dog cover of claim 9 wherein:
    the plurality of attachment means attaching the first side panel to the frame is a plurality of snaps located on the frame and on the first side panel;
    the plurality of attachment means attaching the second side panel to the frame is a plurality of snaps located on the frame and on the second side panel.

15. The wheeled dog cover of claim 9 wherein:
a window is located on the top panel to allow an individual to view a dog being walked using the wheeled dog cover.

16. A wheeled dog cover comprising:
four upper horizontal supports forming a substantially rectangular shape having corners from which four vertical supports extend downward to connect to two lower side horizontal supports and a rear horizontal support all forming a forming a substantially cuboid-shaped frame that will surround a dog and allow the dog to walk freely within the substantially cuboid-shaped frame having a front portion, a first side portion, a second side portion, a top portion and a rear portion;
wheels located at lower ends of the four vertical supports;
a top panel attached to the upper portion of the frame in a manner so the top panel is pulled taut on the frame, thereby covering the upper portion and being capable of deflecting rain;
a push handle located on the rear portion of the frame;
a first side panel removeably attachable to the frame via a plurality of attachment means located proximal to corners of the first side panel;
said first side panel covering the first side portion of the frame;
a second side panel removeably attachable to the frame via a plurality of attachment means located proximal to corners of the first side panel;
said second side panel covering the second side portion of the frame;
said first side panel and second side panel are both rollable so that the first side panel and the second side panel may be rolled upward into a stored position; and
at least two of the four upper horizontal supports are curved to allow rain water to more easily be deflected off of the top panel.

17. The wheeled dog cover of claim 16 further comprising:
a leash attachment bar located on the wheeled dog cover for attaching a leash to the wheeled dog cover.

18. The wheeled dog cover of claim 16 wherein:
at least two of the wheels located at lower ends of the four vertical supports are swivel wheels.

19. The wheeled dog cover of claim 16 wherein:
the plurality of attachment means attaching the first side panel to the frame is a plurality of snaps located on the frame and on the first side panel;
the plurality of attachment means attaching the second side panel to the frame is a plurality of snaps located on the frame and on the second side panel.

20. The wheeled dog cover of claim 16 wherein:
a window is located on the top panel to allow an individual to view a dog being walked using the wheeled dog cover.

* * * * *